July 1, 1952  T. P. MELOY  2,602,142
X-RAY SPECTROGRAPH
Filed Nov. 15, 1949  4 Sheets-Sheet 2

INVENTOR.
THOMAS P. MELOY

July 1, 1952 T. P. MELOY 2,602,142
X-RAY SPECTROGRAPH
Filed Nov. 15, 1949 4 Sheets-Sheet 3

INVENTOR.
THOMAS P. MELOY
BY
Hyman Hurvitz

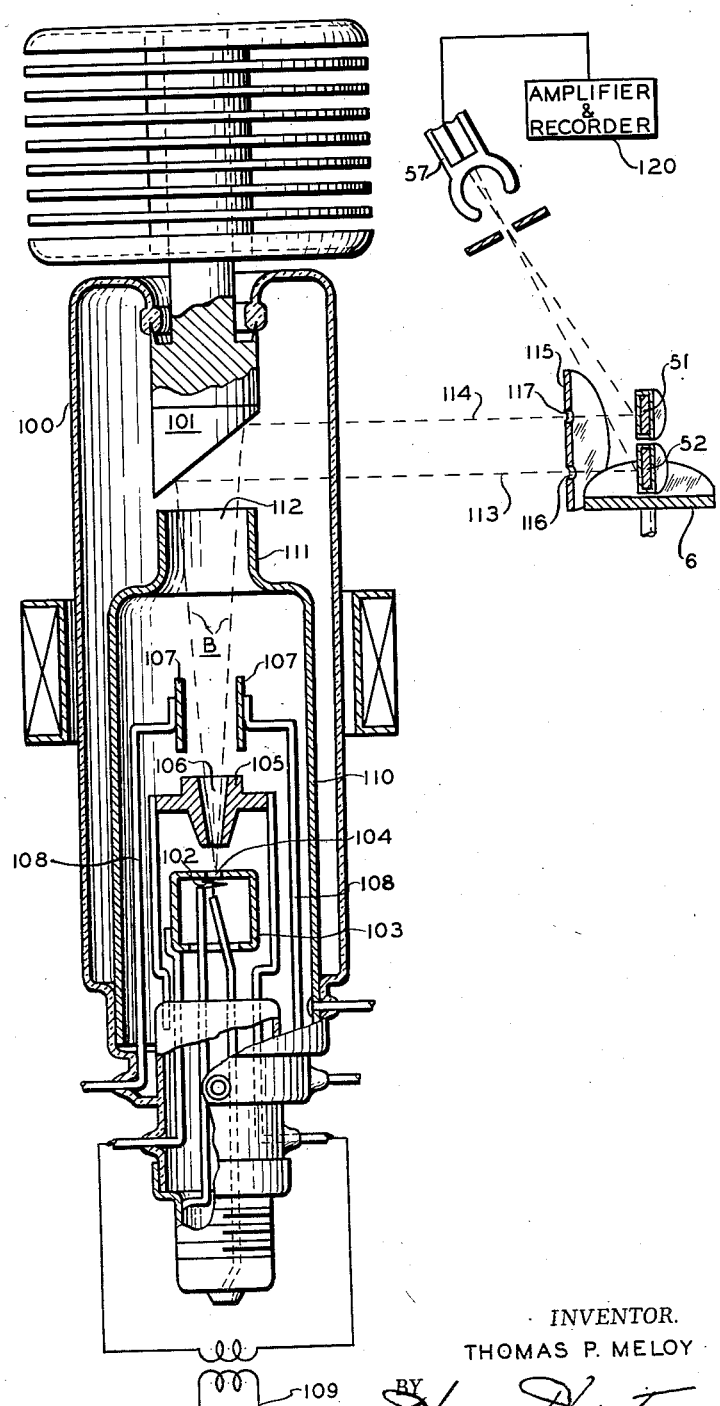

Patented July 1, 1952

2,602,142

UNITED STATES PATENT OFFICE 2,602,142

X-RAY SPECTROGRAPH

Thomas P. Meloy, Cambridge, Mass., assignor to Melpar, Inc., Alexandria, Va.

Application November 15, 1949, Serial No. 127,323

5 Claims. (Cl. 250—53)

This invention relates generally to methods and apparatus for the interpretation of radiation diffraction patterns, and more particularly to novel methods and apparatus for providing comparison diffraction patterns.

One conventional system for measuring the relative intensities of the components of an X-ray diffraction pattern involves use of a photographic film on which the diffracted X-ray beams are directed for a period of time sufficient to effect chemical reaction on the film, the relative amount of the chemical reaction being visible by inspection of the film, or by photometric means, and being indicative at each point of the film of the intensity of the diffraction pattern component at the point.

More recently systems have been developed for obtaining diffraction measurements by means of the Geiger-Muller counter, such systems consuming very considerably less time than do the photographic methods.

The general systems involved have been well known for a long time, and in the simplest form correspond to the simple Bragg spectrometer. Variations of the simple system are also well known, one of which is disclosed in U. S. Patent #2,386,785, issued to Herbert Friedman, on October 16, 1945.

Essentially the Bragg method involves the generation of a beam of monochromatic X-rays, which are utilized to irradiate a target consisting of a crystal. In other methods, crystal powder or amorphous material is used. In any event, the material may be called a specimen. The angle which the specimen makes with the beam of X-ray radiation is varied from 0° to 90°, if the specimen be a single crystal, and a predetermined fraction of the total number of photons in the reflected beam at each angle is measured by means of a Geiger-Muller counter or ionization chamber for each angle of reflection. The output of the Geiger-Muller counter may be measured in any desired way, although the usual method involves recording the intensity of the average current output of the counter on a strip of record receiving surface, which is synchronized in its motion with the rotation of the counter. In this way the specimen and the counter may be continuously rotated through a desired range of angular values and at the termination of the rotation a plot will have been created on the record receiving surface of the average output of the Geiger-Muller counter for each angle. Study of the plot then conveys, to the trained observer, considerable information concerning the crystal structure of the specimen, from which may be deduced the chemical constitution and various physical properties of the specimen.

If the specimen be a powder or an amorphous substance, rotation of the specimen becomes unnecessary, or, if the specimen is rotated its rotation need not be synchronized with rotation of the counter with respect to the specimen.

It is found in practice that considerable difficulty inheres in affecting fluorescent or crystal analysis by means of X-ray spectroscopy, especially when complex substances, or mixtures of substances are to be analyzed. This is true for several reasons, among which may be mentioned background effects, which are recorded, the extremely large number of lines which may be recorded, the overlap or lack of resolution between various of the lines, and the like.

I have, accordingly, devised a fundamentally novel system of X-ray spectroscopy, to which I have applied the name comparison spectroscopy. In accordance with my novel system I obtain a recorded X-ray diffraction pattern which represents the difference between the patterns which would be produced by a given sample, in accordance with conventional practices, and the pattern which corresponds to a comparison specimen containing known substances, the pattern then represents only those constituents of the test specimen which are not present in the comparison specimen. Thereby, analysis of diffraction patterns is very considerably simplified, especially in cases involving the identification of impurities in otherwise known mixtures or compounds, or the study of differences between compounds which are in many respects identical.

It is a broad object of the invention to provide an improved X-ray spectrometric method and apparatus.

It is a further object of the present invention to provide a comparison X-ray spectrometer capable of providing a plot of the relative diffraction patterns of a plurality of substances, simultaneously.

It is still another object of the invention to provide an X-ray spectrometer capable of providing a plot of the difference between two diffraction patterns.

It is a more specific object of the invention to generate two diffraction patterns of two different specimens simultaneously, the specimens being irradiated by an identical X-ray beam, and the diffraction patterns being measured by separate Geiger-Muller counters, the output of the counters being continually opposed so that only those diffraction pattern components are recorded which are not simultaneously present in both specimens.

It is still another specific object of the invention to provide a system of X-ray spectrometry wherein two distinct samples are subjected to analysis by irradiating the samples alternately by means of a single X-ray beam, measuring the Geiger-Muller output from the samples, amplifying the measurements in independent amplifier channels, and recording the amplified outputs of the two channels in opposite senses on a common recorder, so that those diffraction components which are commonly present in both samples produce zero deflection of the pen of the recorder while those which are present in only one specimen affect deflections in one sense in response to one of the specimens, and in the opposite sense in response to the other.

It is still another specific object of the invention to provide a novel system of comparison X-ray spectrometry wherein a pair of specimens are subject to simultaneous analysis, the specimen being irradiated by a single X-ray beam, the diffraction component being measured by a single Geiger-Muller counter, and the output of the Geiger-Muller counter in response to each of the samples being measured by means of a single A. C. amplifier which provides at its output a measure of the difference between the diffraction patterns for each angle of measurement.

Further features, advantages and objects of the present invention will become apparent upon consideration of the following detailed description of various embodiments thereof, especially when taken in conjunction with the accompanying drawings wherein.

Figure 2A:
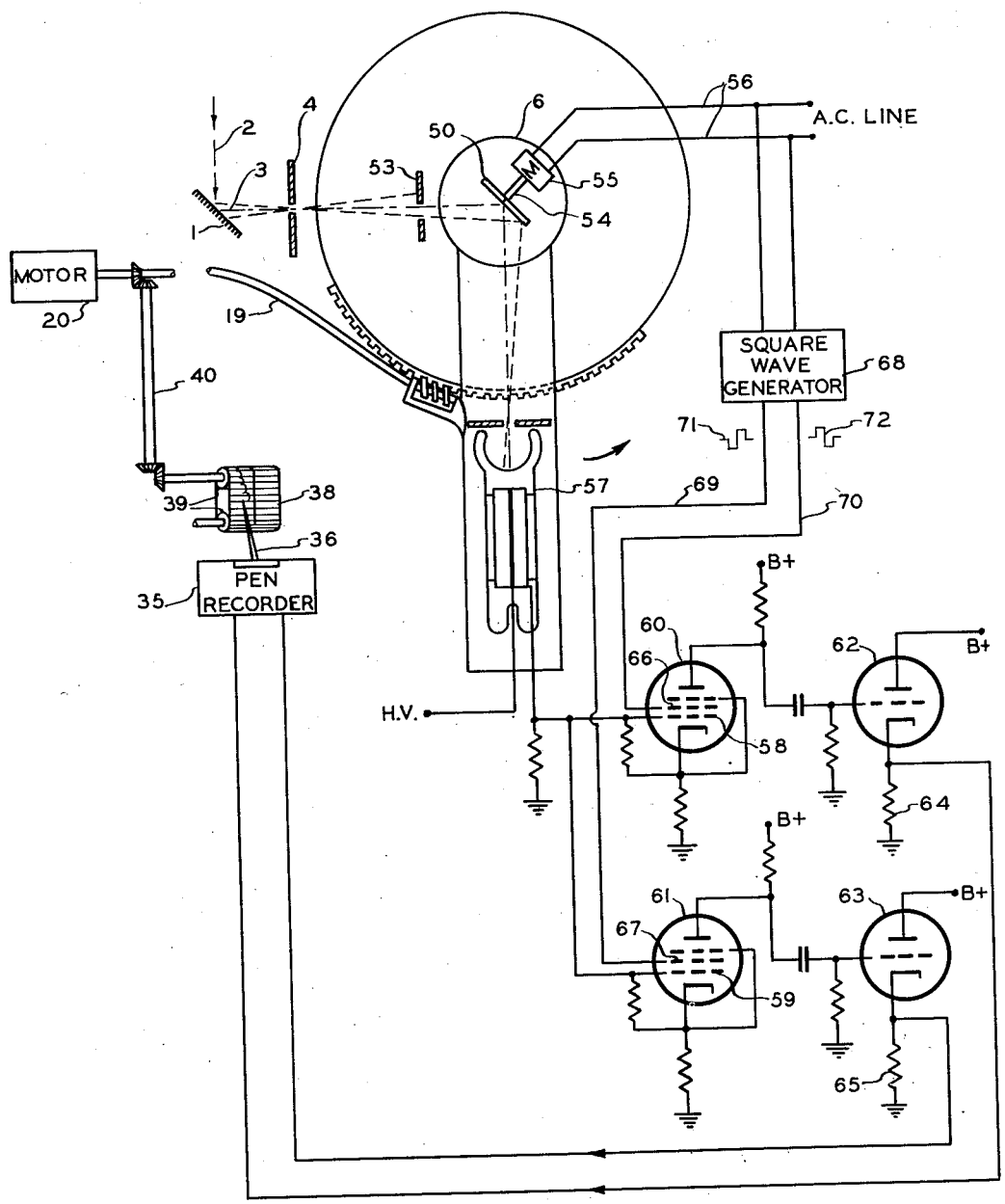
Figure 2a represents a modification of the system of Figure 1 wherein a single Geiger-Muller counter is utilized, instead of a pair of said counters, and wherein the output of the Geiger-Muller counter is commutated in alternation to a pair of amplifiers in synchronism with presentation of the samples in alternation to the X-ray beam.
Figure 3:
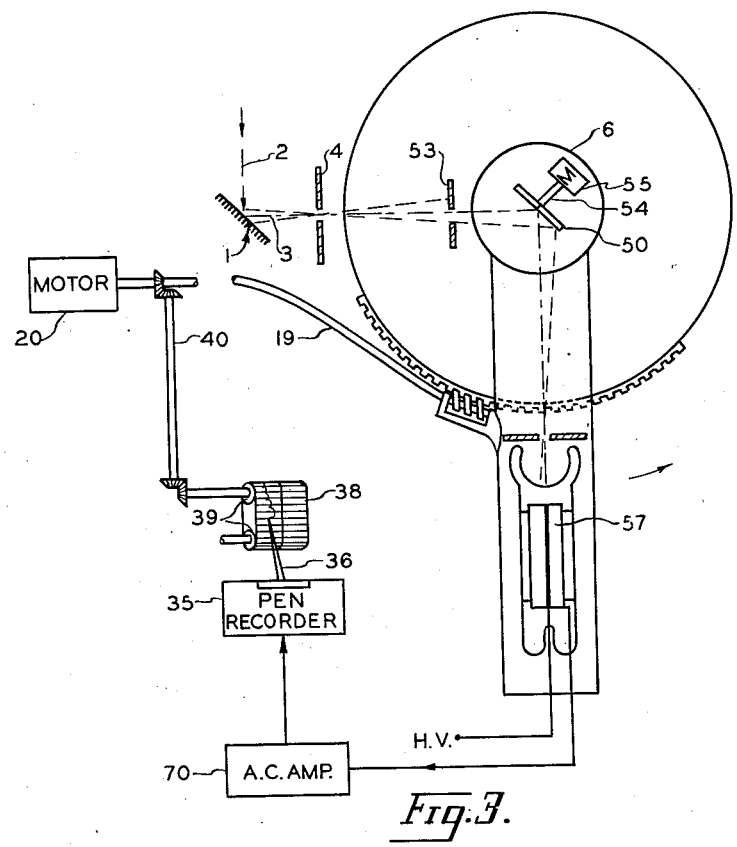

Figure 3 represents an embodiment of the invention of Figure 2, wherein the output of the Geiger-Muller counter is applied to an alternating current amplifier which provides at its output a measure of the difference between the Geiger-Muller output occurring in response to commutation of the samples with respect to the X-ray beam, no output being present for those components of the diffraction pattern which are identical when derived from both samples.

Figure 1:
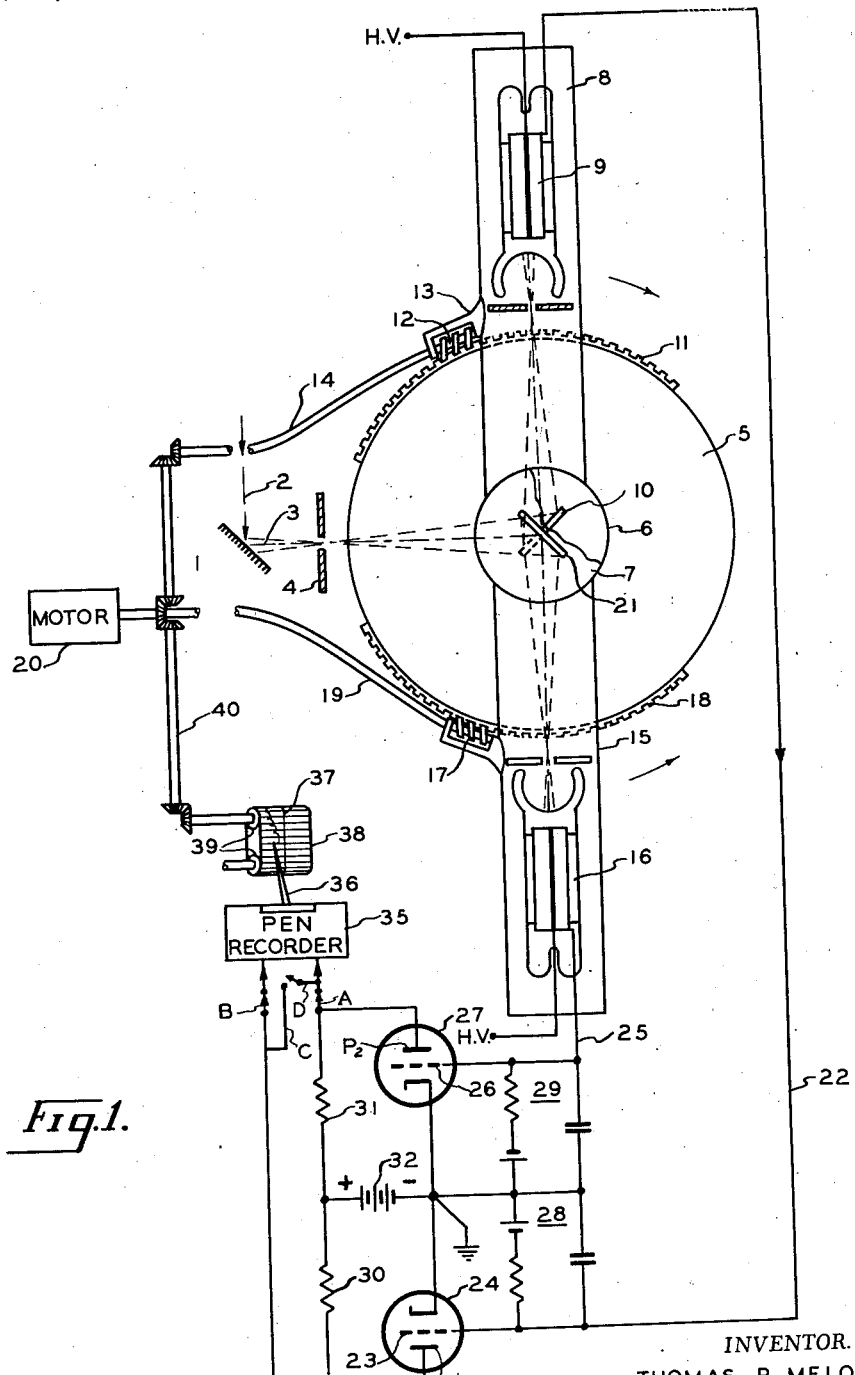
Figure 1 illustrates schematically a first embodiment of the present invention, utilizing a pair of Geiger-Muller counters for simultaneous X-ray spectrometry of a pair of specimens.
Figures 2B, 4:
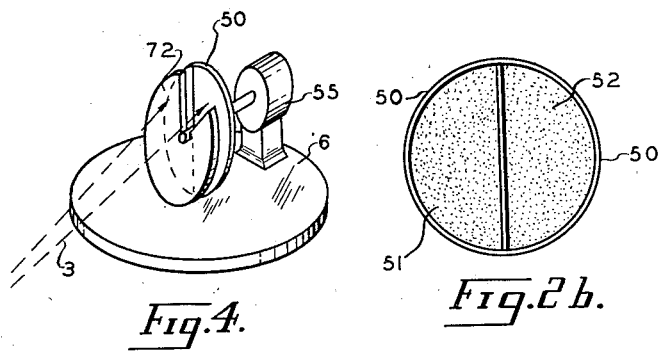
Figure 2b is an elevational view of a pair of samples mounted in a holder.

Figure 4 illustrates a modification of the systems of Figures 1-3 inclusive, wherein a rotatable filter is employed with a stationary specimen holder, instead of a rotary specimen holder; and, Figure 5 illustrates a novel method of commutating an X-ray beam with respect to a pair of specimens in a comparison X-ray spectrograph.

Referring now more specifically to the embodiment of my invention illustrated in Figure 1 of the drawings, the reference numeral 1 indicates an X-ray target, which is irradiated by a beam of electrons 2 and which, accordingly, produces X-rays represented by the dotted line 3. The X-rays 3 are passed through a slit in a plate 4, which may be adjustable in respect to size to vary the intensity of the X-ray beam as it passes beyond the slit. A table 5 is provided, which remains stationary during the operation of the apparatus. On the table 5 is mounted a pair of specimen tables, 6 and 7, which are axially rotatable in opposite directions with respect to the table 5. Coupled mechanically to the table 6 is an arm 8 to which is secured the Geiger-Muller tube 9. The arm 8 is mounted radially of the specimen table 6 and is adapted to rotate therewith, the table 6 carrying a specimen 10 consisting of a crystal, or the like. The arm 8 and consequently the Geiger-Muller counter 9 is so oriented with respect to the crystal 10 that X-rays impinging on the target 10 are diffracted to the Geiger-Muller counter 9. The axis of the Geiger-Muller tube 9 is shown in Figure 1 as instantaneously occupying a position perpendicular to the direction of the X-ray beam 3, and accordingly the sample 10 is oriented at an angle of 45° with respect to both the tube 9, and the beam 3, so that the beam 3 may be reflected to the Geiger-Muller counter by the specimen 9. Formed on the periphery of the table 5 is a rack segment 11 with which meshes a worm 12, which is secured by means of a bracket 13 to the arm 8. The worm 12 is driven by means of flexible shaft 14, rotation of the worm 12 effecting translatory motion thereof with respect to the rack 11 and, accordingly, rotary motion of the arm 8 with respect to the table 5. Alternately, any other convenient drive means may be employed, since the specimen table 6 is coupled to the arm 8, the specimen table 6 rotates, presenting the specimen 10 to the X-ray beam 3 over angles varying from parallel to perpendicular i. e. over a total range of 90°, the worm 12 being arranged to effect clockwise rotation of the arm 8. The Geiger-Muller counter 9, which is illustrated for example only, is of conventional character and has been adequately described in the above mentioned patent to Friedman, and, accordingly, requires no elucidation in the present application.

Those familiar with the art will realize that if the specimen 10 is a single crystal, the specimen table 6 must rotate at one-half the angular velocity of the Geiger-Muller counter 9. If, however, the specimen 10 is amorphous or consists of powdered crystal, the specimens may take the form of a pair of filaments or of a pair of cylindrical tubes filled with the specimens. In such case rotation of the specimen table 6 is not required, but if such rotation is effected it need not be synchronized with rotation of the Geiger counter. No mechanism for rotating the table 6 with respect to the counter 9 has been illustrated or described, however, since various mechanisms for the purpose are well known in the art and are available in commercial equipments.

A second specimen table 7 is secured to an arm 15, corresponding in structure with the arm 8, and carries a Geiger-Muller counter 16 similar to the counter 9. Secured to the arm 15 is a worm gear 17, which meshes with a rack segment 18 secured to the table 5. The worm 17 is driven by means of a flexible shaft 19 in such sense as to effect counter-clockwise rotation of the arm 15. The shafts 14 and 19 are driven commonly by means of a motor 20, so that they rotate at the same angular velocity, and the instrument is so adjusted that the arms 8 and 15 initially occupy identical angular relations.

The specimen table 7 carries a specimen 21 which is in some respects similar to, but not identical with, the specimen 10. In accordance with one application of the invention, for example, the specimen 10 may comprise a powder crystal known to be pure while the specimen 21 comprises a sample of the same crystal powder known to contain impurities. We have, then, effectively two spectrometers arranged for simultaneous duplicating operation on dissimilar samples.

Sample 21 is mounted at an angle of 90° precisely with respect to the sample 10, and in the positions shown the tubes 9 and 16 are diametrically opposite. Specimens 10 and 21, accordingly, are arranged with their axes symmetrical with respect to the X-ray beam 3, so that each presents an angle of 45° to the X-ray beam 3, and each presents an identical spectrum component to its Geiger-Muller counter.

Responsive to rotation of the motor 20, the Geiger-Muller counters 9 and 16, respectively, and the associated specimens 10 and 21, respectively, are rotated, the latter presenting always identical angles to the X-ray beam 3 and to the Geiger-Muller counters 9 and 16, if the specimens are crystals, so that each of the Geiger-Muller counters generates the same output if the specimens are identical. The output of the Geiger-Muller counter 9 is applied over the lead 22 to the control electrode 23 of a triode 24, or the like, for amplification thereby. Similarly the output of the Geiger-Muller counter 16 is applied over the lead 25 to the control electrode 26 of a triode 27, or the like, for amplification thereby. Capacitative input circuits 28 and 29, associated with the triodes 24 and 27, act as integrating circuits for the outputs of the counters.

The anodes P1 and P2 of the triodes 24 and 27, respectively, are connected in push-pull relation over resistors 30 and 31, the anodes being supplied in parallel with anode voltage from a source 32, the negative terminal of which is connected to the cathodes of the triodes 24, 27 and the positive terminal to the junction of the resistors 30 and 31. The anodes of the triodes 24 and 27 are connected to a pen recorder 35, comprising a pen 36 which is movable laterally either to the left or the right of a center line 37, contained on the record receiving surface 38, in response to signal applied to the pen recorder 35 from the triodes 24 and 27. The record receiving surface 38 is mounted on a pair of cylindrical drive members 39, one of which is rotated by means of a shaft 40 driven from the motor 20 and hence in synchronism with angular motion of the Geiger-Muller counters 9 and 16. The longitudinal position of each mark created on the record receiving surface 38 may be calibrated, accordingly, in terms of the angular position of the Geiger-Muller counters 9, 16, or of the angular relation of the sample holders 10 and 21 to the X-ray beam 3. For any angular position for which the spectrum components as measured by the counters 9 and 16 are identical, current flow in the triodes 24 and 27 will similarly be identical, the voltages across the resistors 30 and 31 will be identical and the pen recorder 35 will, accordingly, read zero. Should the samples 10 and 21 be identical as to crystal structures therefore, no output will be applied to the pen recorder 35 over the entire angular range of movement of the samples 10 and 21, and no record will result. For each angular position of the samples 10 and 21 for which a difference of spectrum exists, however, this difference will be recorded, in one sense laterally of the record receiving surface 38 if a component is detected by the tube 9 and not by the tube 16, and in the opposite sense for opposite conditions. Accordingly, the resulting spectrum traced on the record receiving surface 38 represents the difference between the spectrum of the samples 10 and 21, the actual duplicating spectral lines generated by the samples 10 and 21 having been completely eliminated.

I have, accordingly, provided the art with a new and useful instrument capable of obtaining results in the field of X-ray spectrum analysis which have not heretofore been possible, and specifically the possibility of obtaining a comparison spectrograph, from which duplicate lines due to a pair of specimens have been eliminated, leading to enormous simplifications of analysis of spectra.

The system of Figure 1 of the drawings presents certain weaknesses, revolving primarily about the fact that for accurate work the Geiger-Muller counters 9, 16 and the amplifiers comprising the triodes 24 and 27, must be identical, or provide identical overall responses. While this can be accomplished, in practice, it requires vigilance to assure that the conditions of equality are maintained.

I have, accordingly, devised a further system, illustrated schematically in Figure 2a of the drawings, which employs but a single counter, and a plurality of speciments which are presented in alternation for irradiation by the X-ray beam 4. To this end, the specimens to be irradiated are mounted, respectively, in separate compartments of a container 50, (See Figure 2b) one of the samples being identified by the reference numeral 51 and the other by the reference numeral 52, and the two samples preferably occupying or located within opposite semi-circles of the container 50. The beam of X-rays deriving from the target 1 may be assumed to diverge slightly from the aperture in the plate 4, and, accordingly, a stop or filter 53 is interposed to cut off half the beam, leaving the remaining half, so as to irradiate one semi-circular portion only of the target 50. The container 50 is mounted on a shaft 54, which is rotated by means of an alternating current synchronous motor 55 at a relatively high speed, of the order of 30 R. P. S., the motor 55 being energized from the A. C. supply lines 56. Accordingly, for each position of the Geiger counter 57, the input to the counter is alternately that produced in response to irradiation of the speciments 51 and 52, these specimens being irradiated each 30 times per second, and in alternation, for the assumed motor speed of 30 revolutions per second.

The output of the Geiger counter 57 is applied in parallel to the control electrodes 58 and 59 of pentodes 60 and 61, respectively, the anode circuits of which are respectively coupled in conventional fashion to cathode coupled triodes 62 and 63, respectively, the cathode coupled output resistors 64 and 65 of which are connected to the pen recorder 35 as in the system of Figure 1 of the drawings, i. e., each to introduce an oppositely directed deflection. Oppositely phased square wave signals are applied to the screen grids 66 and 67 of pentodes 60, 61 from the square wave generator 68, the square wave outputs of which are synchronized from the A. C. line 56, so that each square wave occurs at the proper instant in the rotation of the samples 51 and 52, the square wave presented over the line 69 being oppositively phased with respect to the square wave presented over the line 70 as illustrated as 71 and 72 so that the pentodes 60 and 61 will be switched on in alternation. The phasing of the square waves 71 and 72 with respect to the rotation of the target 50 is so arranged that the pentode 60 is turned on while the sample 51 is being irradiated, being otherwise turned off, and so that the pentode 61 is turned on while the target 52 is being irradiated, and is otherwise turned off. Accordingly, the output of the Geiger counter is channeled to the two pentodes 60, 61 so that one pentode 60, presents the intensity of the spectral lines due to the sample 51, while the other pentode 61 presents the intensity of the spectral lines due to the sample 52. The pen 36 of the pen recorder 35 has considerable inertia, so that while both targets are causing generation of identical spectral lines the pen 36 is not deflected. Should either of the samples 51, 52 effect generation of a spectral line which does not correspond to a spectral line present in the other sample the pen recorder will deflect accordingly, i. e., in one direction for the sample 51 and in the opposite direction for the sample 52. Accordingly, the completed record will be a record of the difference between the spectra generated by the two samples, indicating only those lines which are not common and identical for the two specimens.

In accordance with the system of Figure 2 of the drawings, an identical X-ray beam irradiates the two speciments, while but a single Geiger counter tube measures the intensities of any spectral lines which are generated. The system has the defect, however, that two separate channels are utilized for amplification of the signals, and the further defect that these channels must be synchronously rendered operative in alternation, leading to some circuit complexity, and still further in that the amplifiers are essentially D. C. amplifiers.

I have devised still another species of the invention, wherein a single X-ray beam irradiates a pair of specimens in alternation, the resulting spectral lines are measured by a single G-M counter, and the output of the G-M counter is amplified in an A. C. amplifier, which amplifies only the difference between intensities of signals due to the separate specimens. No synchronization is required, in accordance with the presently described embodiment, and the amplifier may be made high-gain, yet extremely stable.

Reference is accordingly now made to Figure 3 of the drawings, wherein is illustrated a comparison system of X-ray spectrography, wherein a comparison spectrum is produced in response to irradiation of two samples in alternation, as in the system of Figure 2a, but wherein not only are the specimens irradiated by the same X-ray beam and the reflected energy detected and measured by a single G-M counter, but also the output of the G-M counter generated in response to irradiation of the specimens in alternation are amplified in a single amplifier which, moreover, is an ordinary A. C. amplifier, and, accordingly, may be provided with extremely high amplification, and may be extremely stable. To this end, the general structure and arrangement of Figure 2a is employed, the output of the Geiger-Muller counter 57, however, being applied to the input of an alternating current amplifier 70, the output of which actuates the pen recorder 35. The alternating current amplifier 70 does not respond to D. C. signals, but provides zero output in response to such signals. Accordingly, so long as the reflected energy derived from the separate specimens 51, 52, in response to irradiation by the X-ray beam 3, remain identical, rotation of the samples 51 and 52 produces no alternating current input to the amplifier 60, and, accordingly, the output thereof is zero regardless of the magnitude of the output of the Geiger counter 57. Should there be a difference between the energy reflected by the samples 51 and 52, then rotation of the sample holder 50 produces an alternating output from the tube 57. The tube 57 having applied thereto different energies while the specimen 51 is being irradiated, and the specimen alternating at 30 R. P. S., there is a consequent variation of output from the tube 57 at the frequency of 30 cycles per second. It is true that with the system of Figure 3 it is impossible to determine whether a component of output derives from the sample 51 or 52. If, however, the sample 52, for example, is similar to the sample 51 except for the inclusion of certain impurities or certain additional elements, then only the impurities or the elements will establish a response at the output of the A. C. amplifier 60, and, accordingly, will generate a record on the record receiving surface 38. There is, accordingly, a large field of use for an instrument of this character, especially when consideration is given to the extreme simplicity of the system, which requires no commutation, as in the system of Figure 2a, nor the balancing of two parallel amplifiers as in the systems of Figures 1 and 2a. Each specimen is irradiated by precisely the same X-ray energy, each sample produces reflected energy which is applied to the same Geiger counter tube, and the output of the Geiger counter tube is amplified in a single channel, which may readily be assumed to remain constant over the period required to effect one plot or spectrum analysis, and which, moreover, being an A. C. amplifier, may readily be subjected to automatic volume control or the like for that purpose.

Reference is now made more specifically to Figure 4 of the drawings, wherein is illustrated a modification of the systems of Figures 2a and 3 which is applicable to either of these systems, as a modification thereof, if desired. In accordance with the modification illustrated in Figure 4 the specimen container 50 remains stationary, being secured in any convenient fashion to the specimen table 6, and the drive motor 55 is utilized to rotate a filter 72 with respect to the specimen 50. The filter 72 may be made of various metals, lead being useful in this connection, and may take various specific forms. In the form shown, the filter 72 is cut away over an arc of approximately 20°, thus permitting the X-ray beam 3 to impinge on the samples 50 and 52 (see Figure 2b) in alternation, but not permitting either one of the samples to be irradiated totally. Thereby considerable periods will be available when either one or the other of the samples is irradiated by the X-ray beam 3 to the exclusion of the other, and relatively short periods of simultaneous irradiation will occur.

A similar precaution is essential in the system of Figure 2a, particularly, for similar reasons, and therein the aperture in the filter 53 is dimensioned to permit irradiation of one sample at a time over a relatively small angular sector only, say 10° or 20°. In the system of Figure 3, on the other hand, simultaneous irradiation of both samples is not particularly deleterious and the aperture may be widened to include an arc of as great as 180°, if desired, thus increasing the total energy falling on the Geiger-Muller counter of the system.

The embodiments of my invention illustrated in Figures 1, 2a and 3 of the drawings require physical motion of specimens, while the modification of the systems of Figures 2a and 3, suggested by Figure 4, requires physical motion of a filter. It is desirable to minimize mechanically moving metallic parts in the path of the X-rays of the system, if possible, and I have, accordingly, devised a system of X-ray commutation for application to my system, which involves the scanning of an X-ray beam with respect to specimens instead of scanning of the specimens with respect to the X-ray beam. Reference is now made to Figure 5 of the drawings for an illustration of an X-ray tube arranged for X-ray scanning in an X-ray diffraction system in accordance with the present invention.

There is provided, in accordance with the invention, a non-conductive envelope 100, which may be fabricated of vitreous material, within which is included an anode 101 which may be fabricated of suitable metal, such as copper, and which, when impacted by a suitably accelerated stream of electrons, delivers certain lines of characteristic frequency at relatively high intensity. The electrons are supplied by a thermionic cathode 102 which may be heated by means of any suitable source of electric power.

Surrounding the thermionic cathode 102 is a suitable focusing shield 103 having therein a circular opening 104 which serves to form the beam of electrons B. Adjacent to the focusing shield 103 is an accelerator electrode 105 having a longitudinal aperture 106 which is aligned with the circular opening 104 in the cathode shield 103, and which flares slightly in the direction of travel of the electron beam. It is the function of the accelerator electrode 105 to accelerate the beam of electrons provided by the cathode 102 and the focusing shield 103, to a potential suitable for deflection when the beam passes between the deflecting electrodes or deflector plates 107.

The deflector plates 107 may consist each of a small metallic plate of generally rectangular shape, connected to leads 108, to which may be applied alternating voltage from a source 109, having a frequency say, of 60 cycles per second for purposes of convenience, since that frequency is normally available commercially.

The cathode 102, its focusing shield 103, the accelerator electrode 105 and the deflection electrodes 107 may be enclosed in a generally cylindrical shield 110 which has, at the end thereof adjacent the target, a neck portion 111 having an opening 112, of smaller diameter than the diameter generally of the shield 110, and which defines an opening through which the electrons may pass to the anode 101. The shield 110 operates as a barrier to electrostatic lines of force emanating from the anode, and serves, accordingly, to assure that the total acceleration of the electrons in the beam B, while they are within the shield 110, and prior to the time they emerge from the aperture 112, shall have a velocity determined primarily by the potential of the accelerator electrode 105. After the electrons have passed through the aperture 112 they are subjected to the extremely high positive potential of the anode 101, and attains extremely high velocities, such that they are not readily deflectable in response to electro-static fields, or otherwise. This high velocity is required in order to effect generation of copious quantities of X-rays upon striking the anode 101.

Accordingly, the beam of electrons, generally of circular cross-section, and having a relatively small diameter, is formed by the thermionic cathode 102, its focusing shield 103, and the accelerator electrode 105, and is passed between the deflection electrodes 107 at a relatively low velocity, being deflected during such passage in response to the alternating voltage applied via leads 108 to the deflection electrodes 107, first in one direction and then in the opposite direction. After deflection the beams pass through the aperture 112, are then subjected to an extremely high voltage gradient and are accelerated to a velocity sufficiently high to cause copious emission of X-rays when the beam strikes the target or anode 101.

The beam strikes the anode or target 101 at different points for each value of deflection voltage applied to the deflection electrodes 106 and 107, the point of impact constituting a relatively small area. The anode 101 slopes sharply with respect to the axis of the beam of electrons. Accordingly, the beam of X-rays which is generated, and which diverges but slightly as it leaves the target area, changes its lateral position with respect to the anode 100 in response to the voltage applied to the deflection electrodes 107, scanning between limit lines 113 and 114 60 times per second.

In the path of the X-ray beam is provided a shield member 115, having a pair of apertures 116 and 117, through which, accordingly, the X-ray beam passes in alternation, and in synchronism with the frequency of the voltage applied to the deflection electrodes 107. Two separate specimens, 51 and 52, which are subject to analysis in the equipment, are so positioned on a specimen table that the separate portoins of the X-ray beam traversing or passing through the apertures 116 and 117 each strike one of the specimens, the specimens being arranged one above the other so as to produce comparable diffraction spectra.

Diffracted energy from the two specimens reach the Geiger counter 57 at appropriate times in its travel on an arc of a circle centered on the samples. The Geiger counter supplies its output to the input of an amplifier and recorder 120, which may be of the type illustrated in Figure 2a of the drawings, or alternatively, of the type illustrated in Figure 3 of the drawings.

It will be realized that if the amplifier of amplifier and recorder 120 is an A. C. amplifier, in accordance with the teaching of Figure 3, that the shield 115 is not required, but may be utilized if desired.

It will further be evident that the voltages applicable to the various electrodes of the system have not been illustrated in the drawings, since these are per se conventional, and form no part of my invention.

Referring again to the embodiment of my invention illustrated in Figure 1 of the accompanying drawings, the provision of various switches enables modification of the operation of the system which is of extreme value for many applications.

Specifically a switch A may be provided, which, when open, prevents output from amplifier 27 reaching recorder 35, and a switch B may be provided between amplifier 24 and recorder 35, to prevent output from amplifier 24 reaching recorder 35 when switch B is open. Thereby a recording representative of one only of the samples may be made, if desired.

It is sometimes desirable, further, to provide plots or recordings representative of X-ray diffraction patterns of two materials, both extending in the same direction from a common base line. To this end a circuit C including a switch D may be provided which serves, when switch D is closed and switch B open, to apply the outputs of amplifiers 24 and 27 both to the same side of recorder 35. Accordingly, the outputs of amplifiers 24 and 27 produce identically directed deflections of pen 36.

It will be realized that the various amplifiers illustrated for purposes of example are, in practice, provided with means for adjustment of gain, to enable compensation for differences of tube characteristics and specimen differences. Further, while I have illustrated the various amplifiers as single stage amplifiers, it will be realized that this is for the purpose of simplifying the drawings, and that I contemplate utilizing amplifiers in accordance with advanced designs, the amplifiers per se forming no part of my invention.

While I have described and illustrated the various specific and preferred embodiments of my invention, it will be clear to those skilled in the art that variations and modifications of the specific structure illustrated and described and of various of the arrangements illustrated and described may be resorted to without departing from the true spirit and scope of the invention. In particular, it is realized that while I have applied my invention to the production of X-ray diffraction spectra, that the same principles may be applied in the field of electron diffraction spectrometers, and generally in the field of radiation spectrometers, and especially in the field of fluorescent analysis, with similar advantages to those accruing when the invention is applied to X-ray diffraction spectrometers.

What I claim and desire to secure by Letters Patent of the United States is:

1. A comparison spectroscope comprising, means for mounting a pair of specimens, means for directing a beam of radiation simultaneously and equally on said specimens in a manner adapted to produce a diffracted beam of radiation from each of said specimens, means for varying the angle at which said beam is directed on said specimens, and means for measuring and indicating only the difference of the intensities of said diffracted beams of radiation as said angle varies.

2. A comparison X-ray spectroscope comprising, means for mounting a pair of specimens, means for directing a beam of X-rays simultaneously and equally on said specimens in a manner adapted to produce a diffracted beam of X-rays from each of said specimens, means for rotating said specimens to vary the angle of incidence of said beam thereon, and means for measuring and indicating only the difference of the intensities of said diffracted beams of X-rays at each angle of incidences.

3. A comparison spectroscope, comprising, means for mounting a pair of specimens, means for generating an X-ray beam, means for directing said beam on said pair of specimens simultaneously to provide simultaneously from each of said specimens a diffracted beam of X-rays, means for rotating said specimens to vary the angle of incidence of said beam thereon, means for separately measuring the intensity of diffracted beams from each of said specimens at each angle of incidence, and means responsive to the difference of measurements provided by said means for measuring for indicating a magnitude at each angle of incidence.

4. A device for determining the relative intensities of radiations in X-ray diffraction patterns produced in response to irradiation of non-identical but similar specimens, comprising, means mounting said specimens for rotation about an axis, means for directing a beam of radiation simultaneously upon said specimens in a manner to produce from each simultaneous diffracted beams of radiation, radiation counter means, means mounting said counter means and said specimens for rotation about said axis, means rotating said specimens and said counter means about said axis, the relative positions and rates of movement of said specimens and said counter means being so synchronized as to direct diffracted beams into said counter means throughout said rotation, and means for deriving from said counter means a measure of the difference between the intensities of diffracted beams of radiations deriving from said separate specimens for each position of said specimens and said counter means.

5. The combination in accordance with claim 4 wherein said counter means comprises a pair of Geiger-Muller counters, and wherein said means for rotating rotates said counters in opposite senses about said axis.

THOMAS P. MELOY.

REFERENCES CITED

The following references are of record in the file of this patent:

UNITED STATES PATENTS

| Number | Name | Date |
|---|---|---|
| 2,386,785 | Friedman | Oct. 16, 1945 |
| 2,442,752 | Armstrong | June 8, 1948 |
| 2,467,844 | Michel | Apr. 19, 1949 |
| 2,490,673 | Champaygne et al. | Dec. 6, 1949 |

FOREIGN PATENTS

| Number | Country | Date |
|---|---|---|
| 506,022 | Great Britain | May 22, 1939 |